US008425099B2

(12) United States Patent
Kudelka et al.

(10) Patent No.: US 8,425,099 B2
(45) Date of Patent: Apr. 23, 2013

(54) VENTILATING UNIT WITH MOISTURE ABSORBER, ESPECIALLY FOR A MOTOR VEHICLE HEADLIGHT

(75) Inventors: Jiri Kudelka, Novy Jicin (CZ); Martin Formanek, Novy Jicin (CZ); Moll Pavel, Novy Jicin (CZ)

(73) Assignee: Visteon Global Technologies, Inc., Van Buren Township, MI (US)

( * ) Notice: Subject to any disclaimer, the term of this patent is extended or adjusted under 35 U.S.C. 154(b) by 71 days.

(21) Appl. No.: 13/088,474

(22) Filed: Apr. 18, 2011

(65) Prior Publication Data

US 2011/0261578 A1 Oct. 27, 2011

(30) Foreign Application Priority Data

Apr. 23, 2010 (CZ) ................................ PV2010-314

(51) Int. Cl.
*B60Q 1/04* (2006.01)

(52) U.S. Cl.
USPC .......................................... 362/547; 362/546

(58) Field of Classification Search .................. 362/546, 362/547
See application file for complete search history.

(56) References Cited

FOREIGN PATENT DOCUMENTS

| | | | | |
|---|---|---|---|---|
| EP | 0756966 | A2 | | 2/1997 |
| FR | 2183934 | A1 | | 12/1973 |
| FR | 2716254 | A1 | | 8/1995 |
| GB | 1472189 | A | | 5/1977 |
| JP | 8195104 | A | | 7/1996 |
| JP | 2007149470 | A | | 6/2007 |
| KR | 2002017072 | A | * | 3/2002 |
| WO | 0047932 | A1 | | 8/2000 |

* cited by examiner

*Primary Examiner* — David V Bruce
(74) *Attorney, Agent, or Firm* — Dickinson Wright PLLC

(57) ABSTRACT

A ventilating unit with moisture absorber consists of an essentially vertically oriented bushing (1), provided with shoulders for engaging in an opening made in the bottom part (4) of the headlight cover and a bottom with an outlet opening, while on the bottom of the bushing there is arranged a filtering mechanism (2) on which is fitted a ventilating insert (3) with moisture absorber, whose outer peripheral walls are in close contact with the inner peripheral wall of the bushing (1). Advantageously, a paper filter is the filtering mechanism (2), and magnesium chloride hexahydrate is the moisture absorber, while a sealing element (5) is placed between at least one shoulder of the bushing (1) and the bottom part (4) of the headlight cover.

8 Claims, 1 Drawing Sheet

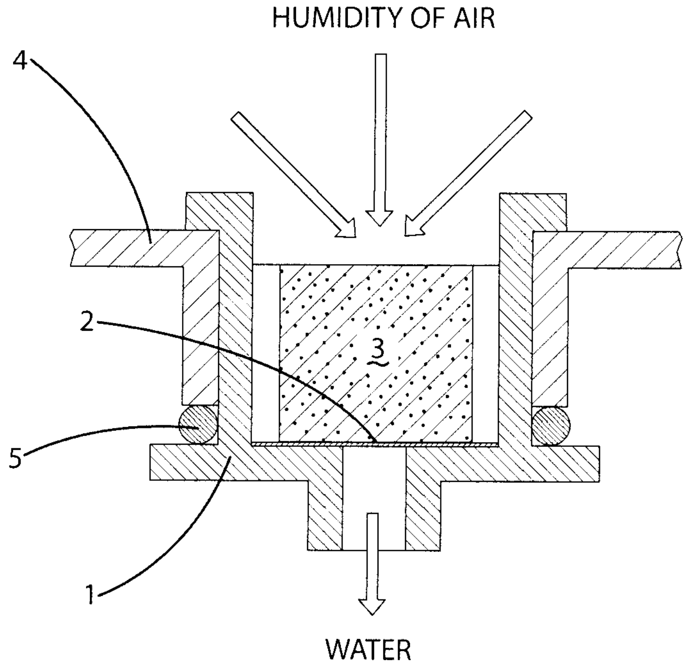
HUMIDITY OF AIR
4
2
3
5
1
WATER

VENTILATING UNIT WITH MOISTURE ABSORBER, ESPECIALLY FOR A MOTOR VEHICLE HEADLIGHT

CROSS REFERENCE TO RELATED APPLICATION

This application claims the benefit of Czech Republic Patent Application No. PV 2010-314 filed Apr. 23, 2010, entitled "Ventilating Unit With Moisture Absorber, Especially For A Motor Vehicle Headlight," the entire disclosure of the application being incorporated by reference herein.

BACKGROUND OF THE INVENTION

1. Technical Field

The invention pertains to a ventilating unit with moisture absorber, which is designed especially for motor vehicle headlights.

2. Discussion

Upon switching off the headlight, the air inside the headlight cools, so that its pressure decreases. As a result, a partial vacuum is produced within the headlight and outside air which may include moisture is sucked into the internal space of the headlight through its ventilation system, as well as within the body and lens of the headlight itself, so that condensation of the water vapor contained in the air drawn in may occur inside of the headlight.

In order to eliminate this problem, headlights are either provided with vent holes or they are equipped with elements containing silica gel for absorbing the water vapor from inside the headlight. Vent holes traditionally have limited effect on preventing condensation. An example of a solution with absorptive material is where a container for silica gel is placed outside the body of the headlight on its upper side, or a container in the shape of a horizontal letter T that contains absorptive material, is placed in a non-rear part of the body of the headlight. In the upper branch of the container is placed absorptive material with a vent tube and a drainage of condensate to the bottom part of the branch. Other examples that could be mentioned are the solutions contained in specifications GB 1472189 or FR 73.16520.

The drawback of the second solution is that the silica gel can only lower the relative humidity in the enclosed system to 40%, and after becoming saturated with water it has to be regenerated (dried out) by heating to 150° C.

SUMMARY OF THE INVENTION

The aforementioned drawback is eliminated by a ventilating unit with moisture absorber, especially for a motor vehicle headlight, according to the present invention, whose essence lies in that it includes an essentially vertically oriented bushing, provided with shoulders for engaging an opening made in part of the body of the headlight and a bottom with an outlet opening. On the bottom of the bushing there is arranged a filtering mechanism on which is fitted a ventilating insert with moisture absorber, whose outer peripheral walls are in close contact with the inner peripheral wall of the bushing.

The ventilating unit includes a paper filter as the filtering mechanism with magnesium chloride hexahydrate as the moisture absorber.

Another feature is that a sealing element is placed between at least one shoulder of the bushing and part of the body of the headlight The advantage of the layout according to the invention is that the design of the ventilating unit carries away the moisture trapped in the moisture absorber through the opening in its bottom away from the headlight and moreover the moisture absorber based on magnesium chloride hexahydrate can lower the relative humidity in the internal space of the headlight to as low as 33%.

Further scope of applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below, the appended claims, and the accompanying drawings in which:

FIG. 1 is a partial section view of the headlight including the ventilating unit with moisture absorber.

DETAILED DESCRIPTION OF THE PREFERRED EMBODIMENT

The ventilating unit with moisture absorber, especially for a motor vehicle headlight (FIG. 1), includes an essentially vertically oriented bushing 1, provided with shoulders for engaging in an opening made in part of the body of the headlight 4 and a bottom with an outlet opening, while on the bottom of the bushing there is arranged a filtering mechanism 2, such as the illustrated filter paper, on which is fitted a ventilating insert 3 with moisture absorber, specifically a form of magnesium chloride hexahydrate, whose outer peripheral walls are in close contact with the inner peripheral wall of the bushing 1.

Between the lower shoulder of the bushing 1 and the part of the body of the headlight 4 is arranged a sealing element 5, having in the present case the shape of an O-ring seal, although other seals of various size, shape or styles may be used.

The design according to this invention can be used especially in the automotive industry for removal of moisture from the internal spaces of all types of lights installed on the motor vehicle.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A ventilating unit with moisture absorber, especially for a motor vehicle headlight, wherein the ventilating unit comprises an essentially vertically oriented bushing (1), provided with shoulders for engaging in an opening made in part of the body of the headlight (4) and a bottom with an outlet opening, while on the bottom of the bushing there is arranged a filtering mechanism (2) on which is fitted a ventilating insert (3) with moisture absorber, whose outer peripheral walls are in close contact with the inner peripheral wall of the bushing (1).

2. A ventilating unit according to claim 1, wherein a paper filter is the filtering mechanism.

3. A ventilating unit according to claim 1, wherein magnesium chloride hexahydrate is the moisture absorber.

4. A ventilating unit according to claim 1, wherein a sealing element (5) is arranged between one shoulder of the bushing (1) and part of the body of the headlight (4).

5. A ventilating unit for a motor vehicle headlight comprising:

a headlight including a body defining an opening;

a bushing having shoulders for engaging said opening in said body of said headlight, and having a bottom, including an outlet opening, and inner peripheral walls;

a filtering mechanism within said bushing including a ventilating insert and a moisture absorber and outer peripheral walls in close contact with said inner peripheral walls of said bushing.

6. The ventilating unit of claim 5 wherein said filtering mechanism is a paper filter.

7. The ventilating unit of claim 5 wherein said moisture absorber is magnesium chloride hexahydrate.

8. The ventilating unit of claim 5 wherein a sealing element is arranged between one shoulder of the bushing and the body of the headlight.

* * * * *